(12) United States Patent
Gschwind et al.

(10) Patent No.: US 10,698,688 B2
(45) Date of Patent: *Jun. 30, 2020

(54) EFFICIENT QUANTIZATION OF COMPARE RESULTS

(71) Applicant: INTERNATIONAL BUSINESS MACHINES CORPORATION, Armonk, NY (US)

(72) Inventors: Michael K. Gschwind, Chappaqua, NY (US); Brett Olsson, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/748,510

(22) Filed: Jun. 24, 2015

(65) Prior Publication Data

US 2016/0378482 A1 Dec. 29, 2016

(51) Int. Cl.
*G06F 9/30* (2018.01)

(52) U.S. Cl.
CPC ...... *G06F 9/30094* (2013.01); *G06F 9/30021* (2013.01); *G06F 9/30025* (2013.01); *G06F 9/30072* (2013.01)

(58) Field of Classification Search
CPC ............ G06F 9/30181; G06F 9/30021; G06F 9/30025; G06F 9/30072; G06F 9/30094; G06F 9/30029; G06F 9/30036
See application file for complete search history.

(56) References Cited

U.S. PATENT DOCUMENTS

| 5,471,593 | A | 11/1995 | Branigin |
| 5,892,697 | A | 4/1999 | Brakefield |
| 6,023,751 | A | 2/2000 | Schlansker et al. |
| 6,484,253 | B1 * | 11/2002 | Matsuo ............... G06F 9/30021 |
| | | | 712/212 |
| 6,912,649 | B2 | 6/2005 | Luick |
| 6,944,853 | B2 | 9/2005 | Topham |
| 7,191,316 | B2 | 3/2007 | Sugumar et al. |
| 7,685,402 | B2 | 3/2010 | Garg et al. |

(Continued)

OTHER PUBLICATIONS

Mark McDermott, "The ARM Instruction Set Architecture", Aug. 22, 2008, pp. 17-19.*

(Continued)

*Primary Examiner* — Aimee Li
*Assistant Examiner* — Courtney P Carmichael-Moody
(74) *Attorney, Agent, or Firm* — Steven Chiu, Esq.; Kevin P. Radigan, Esq.; Heslin Rothenberg Farley & Mesiti P.C.

(57) ABSTRACT

A set machine instruction is provided that has associated therewith a result location to be used with a set operation. The set machine instruction is executed, which includes checking contents of a selected field, and determining, based on the checking, whether the contents of the selected field indicate a first condition, a second condition or a third condition represented in one data type. The result location is set to a value based on the determining, wherein the value, based on the setting, is of a data type different from the one data type and represents a result of a previously executed instruction. The result of the previously executed instruction being one of the first condition, the second condition or the third condition.

12 Claims, 7 Drawing Sheets

(56) References Cited

U.S. PATENT DOCUMENTS

| | | | |
|---|---|---|---|
| 7,721,070 | B2 | 5/2010 | Nguyen et al. |
| 7,900,025 | B2 | 3/2011 | Gschwind |
| 7,908,460 | B2 | 3/2011 | Liao et al. |
| 8,041,927 | B2 | 10/2011 | Kobayashi |
| 8,060,545 | B2 | 11/2011 | Lundvall et al. |
| 8,131,661 | B2 | 3/2012 | Ganai |
| 8,650,240 | B2 | 2/2014 | Eichenberger et al. |
| 8,706,795 | B2 | 4/2014 | Lyalin |
| 10,318,291 | B2 | 6/2019 | Ould-Ahmed-Vall et al. |
| 2002/0019928 | A1* | 2/2002 | Saulsbury ............ G06F 9/30021 712/222 |
| 2004/0064683 | A1 | 4/2004 | Kalluri |
| 2004/0068642 | A1* | 4/2004 | Tanaka ................. G06F 9/30014 712/223 |
| 2006/0179265 | A1 | 8/2006 | Flood et al. |
| 2007/0234019 | A1* | 10/2007 | Terashima .......... G06F 9/30061 712/234 |
| 2008/0177980 | A1 | 7/2008 | Citron |
| 2011/0078415 | A1 | 3/2011 | Johnson |
| 2013/0246760 | A1 | 9/2013 | Gellerich et al. |
| 2014/0164747 | A1 | 6/2014 | Gschwind et al. |
| 2014/0297991 | A1 | 10/2014 | Corbal et al. |
| 2015/0227371 | A1 | 8/2015 | Sudhakar |
| 2015/0261529 | A1 | 9/2015 | Gainey et al. |
| 2016/0378468 | A1 | 12/2016 | Gschwind et al. |
| 2016/0378469 | A1 | 12/2016 | Gschwind et al. |
| 2016/0378474 | A1 | 12/2016 | Gschwind et al. |
| 2016/0378475 | A1 | 12/2016 | Gschwind et al. |
| 2016/0378485 | A1 | 12/2016 | Gschwind et al. |

OTHER PUBLICATIONS

Bryant, Randal E., et al., "CS:APP2e Web Aside ASM:SSE: SSE-Based Support for Floating Point," Aug. 5, 2014, pp. 1-20.

Wharton, John, "Using the Intel MCS®-51 Boolean Processing Capabilities," Apr. 1980, pp. 1-48.

Zhang, Jian, "Specification Analysis and Test Data Generation by Solving Boolean Combinations of Numeric Constraints," First Asian-Pacific Conference on Quality Software, Oct. 2000, pp. 267-274.

"Power ISA™ Version 2.06 Revision B," International Business Machines Corporation, Jul. 23, 2010, pp. 1-1341.

"z/Architecture Principles of Operation," IBM® Publication No. SA22-7832-09, Tenth Edition, Sep. 2012, pp. 1-1568.

Gschwind et al., "Conversion of Boolean Conditions," U.S. Appl. No. 14/748,489, filed Jun. 24, 2015, pp. 1-39.

Gschwind et al., "Instruction to Perform a Logical Operation on Conditions and to Quantize the Boolean Result of that Operation," U.S. Appl. No. 14/748,529, filed Jun. 24, 2015, pp. 1-47.

Gschwind et al., "Conversion of Boolean Conditions," U.S. Appl. No. 14/871,699, filed Sep. 30, 2015, pp. 1-35.

Gschwind et al., "Efficient Quantization of Compare Results," U.S. Appl. No. 14/869,816, filed Sep. 29, 2015, pp. 1-35.

Gschwind et al., "Instruction to Perform a Logical Operation on Conditions and to Quantize the Boolean Result of that Operation," U.S. Appl. No. 14/941,560, filed Nov. 14, 2015, pp. 1-43.

List of IBM Patents or Patent Applications Treated As Related, Mar. 10, 2016, 2 pages.

Office Action for U.S. Appl. No. 14/869,816 dated May 10, 2017, pp. 1-20.

Office Action for U.S. Appl. No. 14/748,529 dated May 10, 2017, pp. 1-22.

Hennessy, John et al., "Computer Architecture a Quantitative Approach," May 2002, $3^{rd}$ Edition, pp. 108-110 (+ cover).

Office Action for U.S. Appl. No. 14/748,489 dated May 19, 2017, pp. 1-23.

Office Action for U.S. Appl. No. 14/871,699 dated Jul. 24, 2017, pp. 1-16.

Gschwind et al., Final Office Action for U.S. Appl. No. 14/869,816, filed Sep. 29, 2015 (U.S. Patent Publication No. 2016/0378485 A1), dated Aug. 23, 2017 (25 pages).

Gschwind et al., Final Office Action for U.S. Appl. No. 14/748,529, filed Jun. 24, 2015 (U.S. Patent Publication No. 2016/0378469 A1), dated Sep. 1, 2017 (25 pages).

Gschwind et al., Final Office Action for U.S. Appl. No. 14/941,560, filed Nov. 14, 2015 (U.S. Patent Publication No. 2016/0378475 A1), dated Sep. 1, 2017 (24 pages).

Gschwind et al., Final Office Action for U.S. Appl. No. 14/748,489, filed Jun. 24, 2015 (U.S. Patent Publication No. 2016/0378468 A1), dated Oct. 17, 2017 (22 pages).

Gschwind et al., Final Office Action for U.S. Appl. No. 14/871,699, filed Sep. 30, 2015 (U.S. Patent Publication No. 2016/0378474 A1), dated Oct. 26, 2017 (21 pages).

Nvidia Compute, "PTX: Parallel Thread Execution", ISA Version 2.3 (Mar. 8, 2011) (pp. 102-103).

IBM, "PowerPC User Instruction Set Architecture", Book 1, Version 2.02, Jan. 28, 2005, pp. 18 & 151-157 (230 pages).

* cited by examiner

EFFICIENT QUANTIZATION OF COMPARE RESULTS

BACKGROUND

One or more aspects relate, in general, to processing within a computing environment, and in particular, to comparison processing within the computing environment.

Many programming languages, which are used to create applications that perform functions within a computing environment, execute operations that employ a three way indicator to indicate certain predicates, such as less than (<), greater than (>), or equal (=). For instance, in string processing (e.g., string compares or memory compares), a −1, 1, or 0 is returned based on whether a first operand is less than, greater than or equal to a second operand, respectively. A further example is provided when a sign function is computed as an integer.

In order to provide this three way indicator, however, multiple comparisons are typically used within a complex, data dependent control flow. Further, optimizations, such as automatic prediction, may be attempted, but these still use an excessive number of (e.g., more than 2) instructions and/or architected registers.

SUMMARY

Shortcomings of the prior art are overcome and additional advantages are provided through the provision of a computer program product for executing a machine instruction. The computer program product includes a storage medium readable by a processing circuit and storing instructions for execution by the processing circuit for performing a method. The method includes, for instance, obtaining, by a processor, a machine instruction to perform a set operation, the machine instruction having associated therewith a result location to be used with the set operation; and executing, by the processor, the machine instruction, the executing including: checking contents of a selected field; determining, based on the checking, whether the contents of the selected field indicate a first condition, a second condition or a third condition represented as one data type; and setting the result location to a value based on the determining, wherein the value, based on the setting, is of a data type different from the one data type and represents a result of a previously executed instruction, the result of the previously executed instruction being one of the first condition, the second condition or the third condition.

Methods and systems relating to one or more aspects, as well as other computer program products, are also described and may be claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing, as well as features and advantages of one or more aspects, are apparent from the following detailed description taken in conjunction with the accompanying drawings in which:

DETAILED DESCRIPTION

In accordance with one or more aspects, a capability is provided to efficiently quantize compare results into registers, such as integer registers. Results in one data type, such as binary, that indicate predicates, such as less than (<), greater than (>), or equal (=), are converted into values of a different data type, such as integer values, e.g., −1, +1, 0 in integer form, respectively. As one particular example, an instruction is provided to set a result location associated with the instruction to a value, in which in one particular example, the result location may be a register specified by the instruction to receive the value. The value represents a result of a previously executed instruction (e.g., <, >, =), but is in a data type different from the data type of the result of the previously executed instruction.

As examples, the result location may be a register specified by a result field of an instruction; an implied register of an instruction; a memory location; a field of an instruction, etc. Many examples exist.

Figure 1:
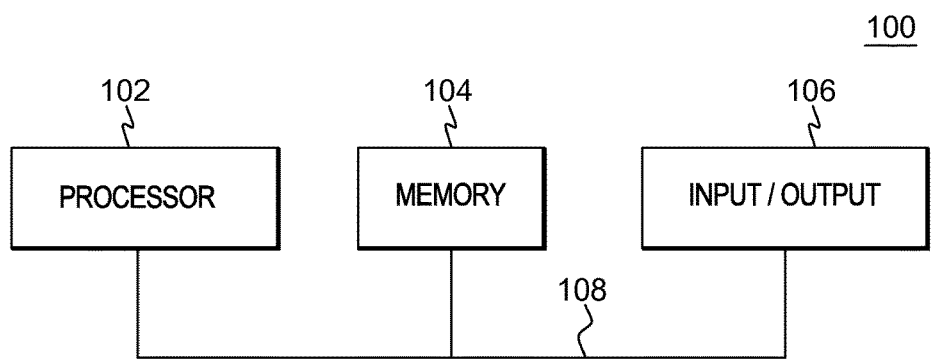
FIG. 1 depicts one example of a computing environment to incorporate and use one or more aspects.

One embodiment of a computing environment to incorporate and use one or more aspects is described with reference to FIG. 1. A computing environment 100 includes, for instance, a processor 102 (e.g., a central processing unit), a memory 104 (e.g., main memory), and one or more input/output (I/O) devices and/or interfaces 106 coupled to one another via, for example, one or more buses 108 and/or other connections.

In one embodiment, processor 102 is based on the Power Architecture offered by International Business Machines Corporation. One embodiment of the Power Architecture is described in "Power ISA™ Version 2.07B," International Business Machines Corporation, Apr. 9, 2015, which is hereby incorporated herein by reference in its entirety. POWER ARCHITECTURE® is a registered trademark of International Business Machines Corporation, Armonk, N.Y., USA. Other names used herein may be registered trademarks, trademarks, or product names of International Business Machines Corporation or other companies.

In another example, processor 102 is based on the z/Architecture offered by International Business Machines Corporation, and is part of a server, such as the System z server, which implements the z/Architecture and is also offered by International Business Machines Corporation. One embodiment of the z/Architecture is described in an IBM® publication entitled, "z/Architecture Principles of Operation," IBM® Publication No. SA22-7832-10, Eleventh Edition, March 2015, which is hereby incorporated herein by reference in its entirety. In one example, the processor executes an operating system, such as z/OS, also offered by International Business Machines Corporation. IBM®, Z/ARCHITECTURE® and Z/OS® are registered trademarks of International Business Machines Corporation.

In yet a further embodiment, processor 102 is based on an Intel architecture offered by Intel Corporation. Intel® is a registered trademark of Intel Corporation, Santa Clara, Calif. Yet further, processor 102 may be based on other architectures. The architectures mentioned herein are merely provided as examples.

Figure 2A:
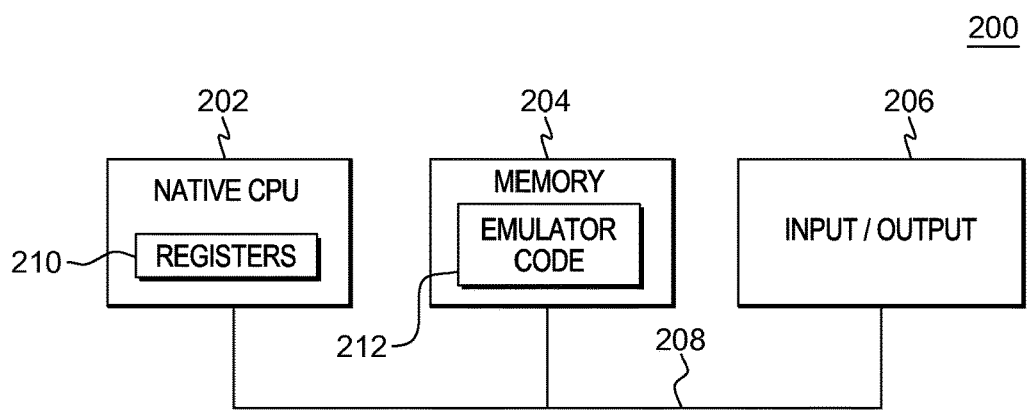
FIG. 2A depicts another example of a computing environment to incorporate and use one or more aspects.

Another embodiment of a computing environment to incorporate and use one or more aspects is described with reference to FIG. 2A. In this example, a computing environment 200 includes, for instance, a native central processing unit 202, a memory 204, and one or more input/output devices and/or interfaces 206 coupled to one another via, for example, one or more buses 208 and/or other connections. As examples, computing environment 200 may include a PowerPC processor, a zSeries server, or a pSeries server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Native central processing unit 202 includes one or more native registers 210, such as one or more general purpose registers and/or one or more special purpose registers used during processing within the environment. These registers include information that represent the state of the environment at any particular point in time.

Moreover, native central processing unit 202 executes instructions and code that are stored in memory 204. In one particular example, the central processing unit executes emulator code 212 stored in memory 204. This code enables the processing environment configured in one architecture to emulate another architecture. For instance, emulator code 212 allows machines based on architectures other than the Power architecture, such as zSeries servers, pSeries servers, HP Superdome servers or others, to emulate the Power architecture and to execute software and instructions developed based on the Power architecture. In a further example, emulator code 212 allows machines based on architectures other than the z/Architecture, such as PowerPC processors, pSeries servers, HP Superdome servers or others, to emulate the z/Architecture and to execute software and instructions developed based on the z/Architecture. Other architectures may also be emulated.

Figure 2B:
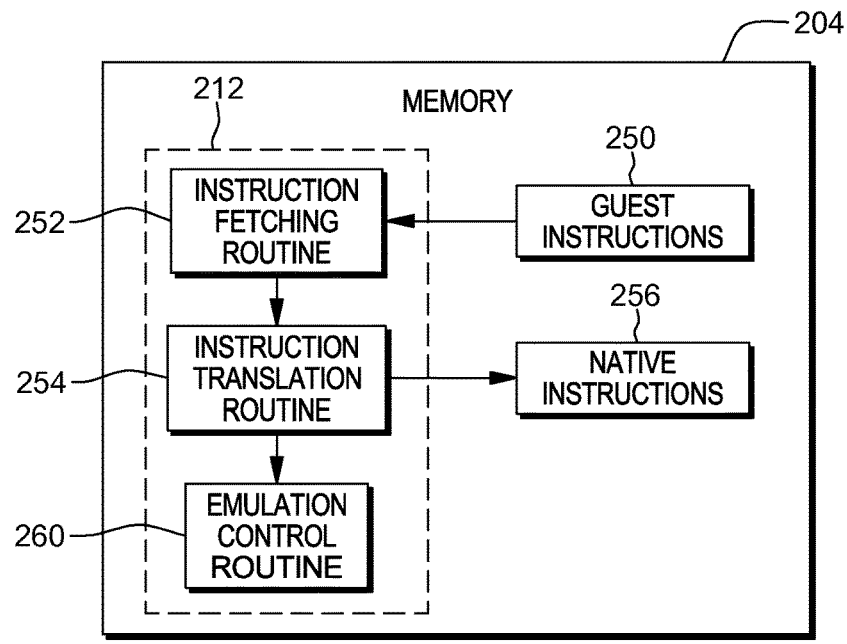
FIG. 2B depicts further details of the memory of FIG. 2A.

Further details relating to emulator code 212 are described with reference to FIG. 2B. Guest instructions 250 stored in memory 204 comprise software instructions (e.g., correlating to machine instructions) that were developed to be executed in an architecture other than that of native CPU 202. For example, guest instructions 250 may have been designed to execute on a PowerPC processor or a z/Architecture processor 102, but instead, are being emulated on native CPU 202, which may be, for example, an Intel Itanium II processor. In one example, emulator code 212 includes an instruction fetching routine 252 to obtain one or more guest instructions 250 from memory 204, and to optionally provide local buffering for the instructions obtained. It also includes an instruction translation routine 254 to determine the type of guest instruction that has been obtained and to translate the guest instruction into one or more corresponding native instructions 256. This translation includes, for instance, identifying the function to be performed by the guest instruction and choosing the native instruction(s) to perform that function.

Further, emulator code 212 includes an emulation control routine 260 to cause the native instructions to be executed. Emulation control routine 260 may cause native CPU 202 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 256 may include loading data into a register from memory 204; storing data back to memory from a register; or performing some type of arithmetic or logic operation, as determined by the translation routine.

Each routine is, for instance, implemented in software, which is stored in memory and executed by native central processing unit 202. In other examples, one or more of the routines or operations are implemented in firmware, hardware, software or some combination thereof. The registers of the emulated processor may be emulated using registers 210 of the native CPU or by using locations in memory 204. In embodiments, guest instructions 250, native instructions 256 and emulator code 212 may reside in the same memory or may be disbursed among different memory devices.

As used herein, firmware includes, e.g., the microcode, millicode and/or macrocode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

In one example, a guest instruction 250 that is obtained, translated and executed is an instruction described herein. The instruction, which is of one architecture (e.g., the Power architecture or z/Architecture) is fetched from memory, translated and represented as a sequence of native instructions 256 of another architecture (e.g., the z/Architecture, Power architecture, Intel architecture, etc.). These native instructions are then executed.

Figure 3A:
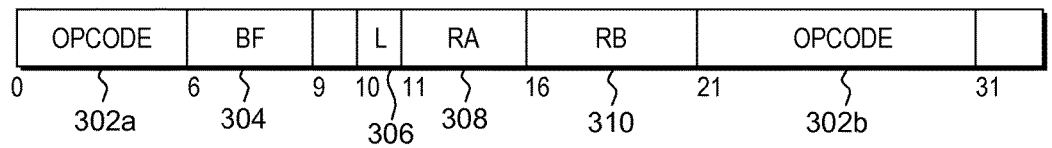
FIG. 3A depicts one example of a compare instruction.

One instruction used in accordance with one or more aspects is a compare instruction used to compare data in two registers. One implementation of a compare instruction is described with reference to FIG. 3A. In one example, a Compare (CMP) instruction 300 includes operation code (opcode) fields 302a (e.g., bits 0-5), 302b (e.g., bits 21-30) indicating a compare operation; a first field (BF) 304 (e.g., bits 6-8) used to indicate a field in a condition register; a second field (L) 306 (e.g., bit 10) used to indicate whether operands are treated as 32-bit operands (L=0) or 64-bit operands (L=1); a third field (RA) 308 (e.g., bits 11-15) used to designate a first register to be compared; and a fourth field (RB) 310 (e.g., bits 16-20) used to designate a second register to be compared with the first register. Each of the fields 304-310, in one example, is separate and independent from one another; however, in other embodiments, more than one field may be combined. Further information on the use of the fields is provided below.

In operation, the contents of register RA (bits 32:63, if L=0, and bits 0:63, if L=1) are compared with the contents of register RB (bits 32:63, if L=0, and bits 0:63, if L=1), treating the operands as signed integers. The result of the comparison is placed into a condition register in a field designated by BF. As examples, if the contents of register RA are less than the contents of register RB, the result is 1000(b-binary); if greater than, the result is 0100(b); and if equal, the result is 0010(b). This result is placed in the condition register in the selected field designated by BF.

Figure 3B:
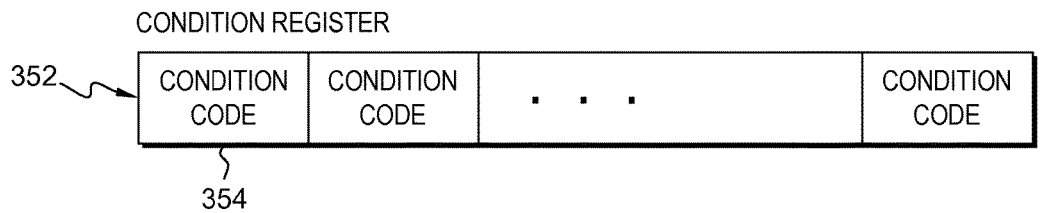
FIG. 3B depicts one example of a condition register.

In particular, as depicted in FIG. 3B, a condition register 350 includes a plurality of fields 352, and each field includes a condition code 354. The condition code is, for instance, four bits, and each bit represents a particular predicate or condition, such as the leftmost bit represents less than, next leftmost bit represents greater than, the next leftmost bit represents equal, and the rightmost bit represents another condition, such as an unordered flag for floating point, etc. The BF field indicates which field in the condition register is to receive the result of the comparison (i.e., which condition code is to be set).

Thus, in one embodiment, the compare instruction compares the contents of the two registers, and places a result of the comparison in a selected field (or condition code) within the condition register. The selected field has a plurality of bits, and each bit represents a particular condition. The setting of a particular bit represents the associated condition. After setting the selected field using, for instance, a compare instruction or another instruction, the selected field of the condition register may be tested and a value may be set, as provided herein.

Although in various examples herein the selected field is one of a plurality of fields in a condition register selected by a field of an instruction, in other embodiments, there is only one field to be selected (such as in a program status word or a flag), and therefore, there is no BF field. The result is just placed in the one field designated to receive the results of the comparison.

Figure 4A:
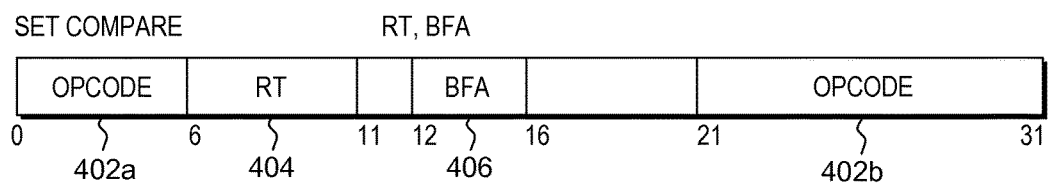
FIG. 4A depicts one example of a Set Compare instruction, in accordance with one or more aspects.

One example of an instruction to test a selected field and set a value is described with reference to FIG. 4A. In one example implementation in the Power Architecture, a Set Compare (setcmp) instruction 400 includes, for instance, opcode fields 402a (e.g., bits 0-5), 402b (e.g., bits 21-31) indicating a set compare operation; a result field 404 (e.g., bits 6-10) used to designate a general purpose register (GPR) to hold the result (RT) of the set compare operation; and a selection field (BFA) 406 (e.g., bits 12-15) used to identify a field within a condition register. Each of the fields 404-406, in one example, is separate and independent from one another; however, in other embodiments, more than one field may be combined. Further information on the use of the fields is provided below.

In operation, if a first selected bit (e.g., bit 0) of the selected field (e.g., the condition register field identified by BFA) is set equal to one (e.g., binary 1 indicating a less than result of the previously executed compare instruction or another instruction), then the contents of the register RT are set to 0xFFFF_FFFF_FFFF_FFFF (i.e., −1 in integer). If, however, the first selected bit is set equal to zero (e.g., in binary), then a further determination is made as to whether a second selected bit (e.g., bit 1) of the condition register field is set equal to one (e.g., in binary indicating a greater than result of the previously executed compare instruction or another instruction). If the second selected bit is equal to one (e.g., in binary), then the contents of the register RT are set to 0x0000_0000_0000_0001 (i.e., 1 in integer). Otherwise, the contents of register RT are set to 0x0000_0000_0000_0000 (i.e., 0 in integer indicating an equal comparison).

In other embodiments, other conditions may be checked. Also, in other embodiments, the contents of the register RT may be set to values in other data types such as, but not limited to, floating point, decimal floating point and binary coded decimal, etc.

One embodiment of pseudo-code for the Set Compare operation includes:
 If CR.bit[4×BFA+32]=1 then
 GPR[RT]=0xFFFF_FFFF_FFFF_FFFF
 Else if CR.bit[4×BFA+33]=1 then
 GPR[RT]=0x0000_0000_0000_0001
 Else
 GPR[RT]=0x0000_0000_0000_0000

In the above pseudo-code, in checking the bit, 32 is added since in this embodiment, the condition register bits start at position 32; however, this is not necessary, and thus, if they begin at 0, no value may be added, or a different value may be added if they start at a different position. Many possibilities exist.

Figure 4B:
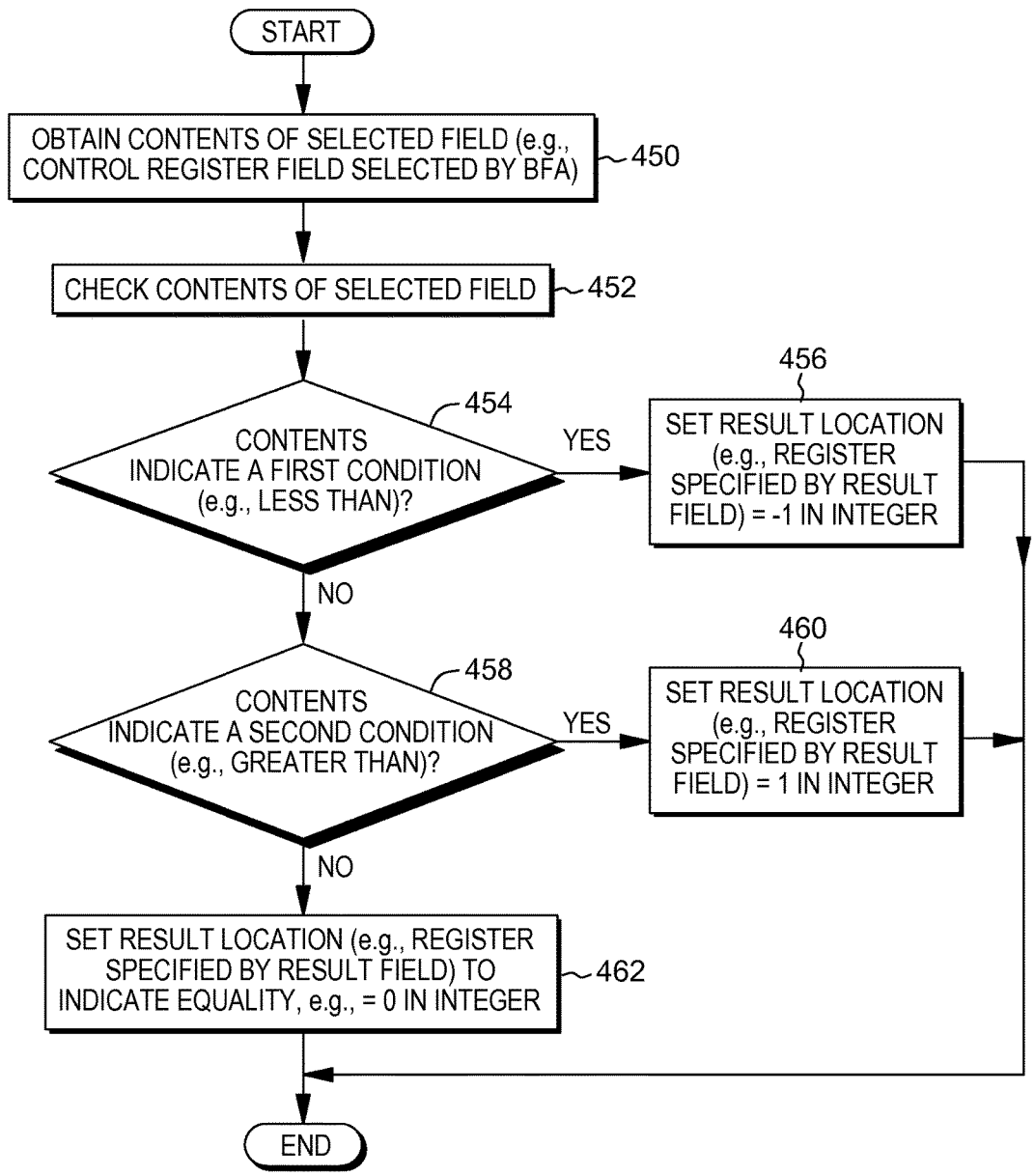
FIG. 4B depicts one embodiment of logic associated with the Set Compare instruction of FIG. 4A, in accordance with one or more aspects.

One embodiment of logic associated with the Set Compare instruction is described with reference to FIG. 4B. Initially, contents of a selected field (e.g., a selected condition register field) are obtained, STEP 450. In one example, contents of BFA are used to index into a condition register to obtain the contents of a specific condition code field (i.e., selected field). In another embodiment, however, there is only one selected field, so there is no need to use BFA to select the selected field.

Further, the contents of the selected field are checked, STEP 452. A determination is made as to whether the contents indicate a first condition, such as a less than condition, INQUIRY 454. For instance, a first selected bit of the selected field (e.g., bit 0), which indicates a less than condition, is checked to determine if it is set to a particular value, e.g., binary one. If it is set to one, indicating the previously executed compare instruction or another instruction resulted in a less than condition, then the result location associated with the Set Compare instruction (e.g., the register identified by the result field) is set equal to a first selected value, e.g., −1 integer, STEP 456. However, if the first selected bit of the selected field is set to binary zero, then a further determination is made as to whether the contents indicate a second condition, such as a greater than condition, INQUIRY 458. For instance, a second selected bit of the selected field (e.g., bit 1), which indicates a greater than condition, is checked to determine if it is set to a particular value, e.g., binary one. If it is set to one, indicating the previously executed compare instruction or another instruction resulted in a greater than condition, then the result location associated with the Set Compare instruction (e.g., the register identified by the result field) is set equal to a second selected value, e.g., 1 in integer, STEP 460. Otherwise, the result location (e.g., the register identified by the result field) is set equal to another particular value, e.g., 0 in integer indicating equality, STEP 462.

In other embodiments, other operations and/or conditions may be represented. For instance, other bits of the selected field may be checked to determine whether a particular condition exists. As an example, a selected third bit (e.g., bit 2) may be checked to see if it is equal to one, and if so, the result field is set to 0 (instead of assuming the result is equal, if it is not < or >). Further, additional bits may be checked for more or different conditions than described herein. Further, the result location may be set to values in other data types, such as floating point, decimal floating point, binary coded decimal, etc. Yet further, although in the example above, the instruction is referred to as a Set Compare instruction, it may be referred to as a Set instruction or other type of set instruction, such as Set Boolean, etc.

Figure 5:
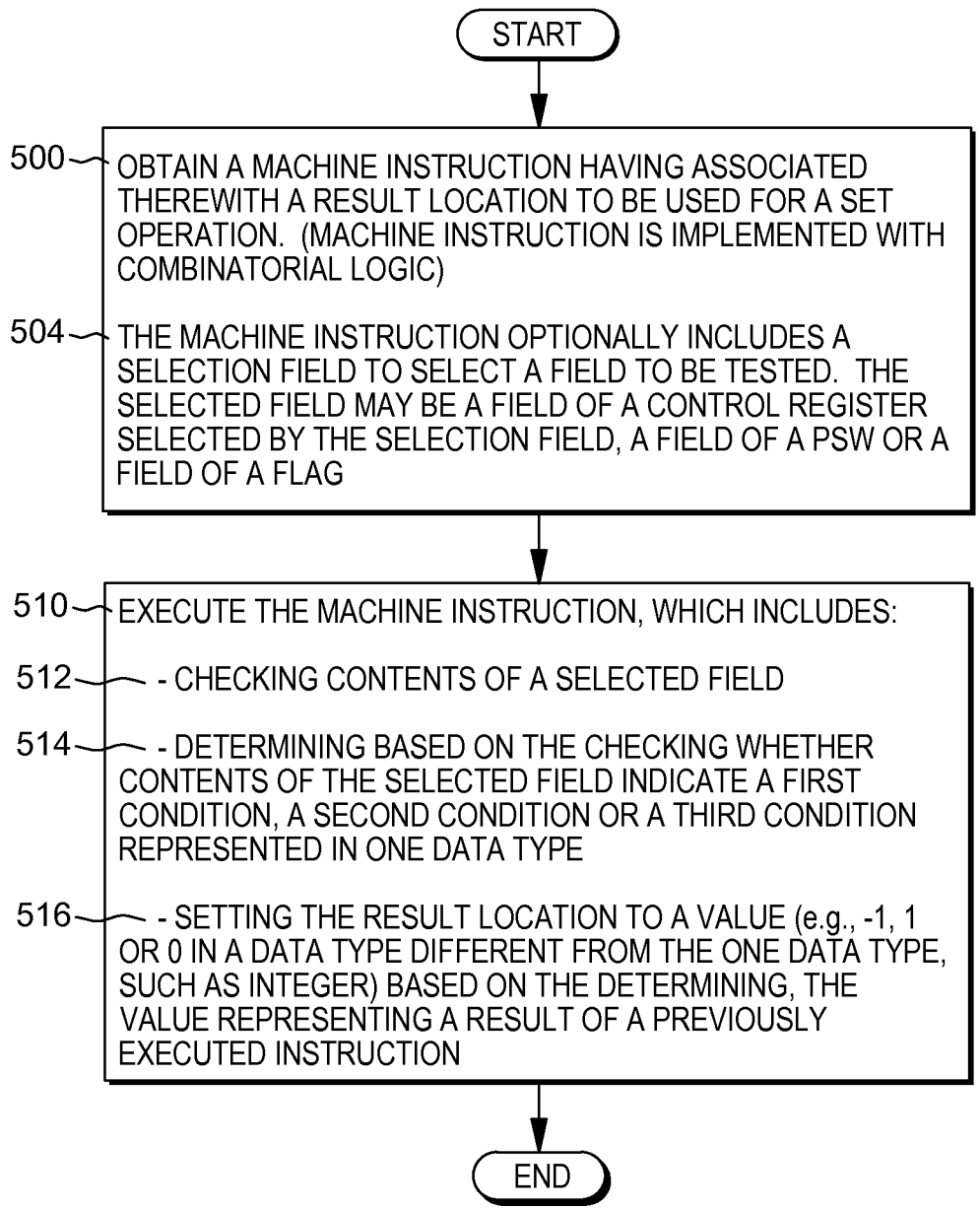
FIG. 5 depicts logic to obtain and execute an instruction to set a value, the value representing one of a plurality of conditions resulting from execution of a previous instruction, in accordance with one or more aspects.

As described herein, in one embodiment and with reference to FIG. 5, a machine instruction (e.g., setcmp) is obtained, and the machine instruction has associated therewith a result location to be used with a set operation, STEP 500. Further, the machine instruction optionally has associated therewith (e.g., includes) a selection field to select a field to be tested, STEP 504. The selected field may be a field of a condition register selected by the selection field, or a field in a program status word (PSW) or a field of a flag, as examples.

The machine instruction is executed, STEP 510. The executing includes, for instance, checking contents of a selected field, STEP 512. For instance, one or more selected bits of the contents are checked to see if they are set. A determination is made, based on the checking, whether the contents of the selected field indicate a first condition, a second condition or a third condition, STEP 514. For instance, if a first selected bit (e.g., bit 0) is set to one value (e.g., binary 1), then the determining indicates the first condition (e.g., less than); if a second selected bit (e.g., bit 1) is set to the one value, then the determining indicates the second condition (e.g., greater than); and if the first selected bit and the second selected bit are set to another value (e.g., binary 0), then the determining indicates the third condition (e.g., equal).

The result location associated with the instruction is then set to a value (e.g., −1, 1 or 0 in integer) based on the determination, STEP 516. The value represents a result of a previously executed instruction, such as a compare instruction, or other instruction. The result of the previously executed instruction is one of the first condition, the second condition or the third condition.

One or more aspects enable the setting of a result location, e.g., a general purpose register, based on a selected field in a register, such as a condition register, or other selected field. The selected field is tested, and an indication of less than (−1), greater than (1), or equal (0) in a selected data type is loaded into the general purpose register, depending on the contents of the selected field. This capability enables the setting of the result location without branch code, without the use of an inordinate number of (e.g., more than two) instructions and registers, and without introducing dependencies between multiple instructions. This allows less expensive and easier code to execute. It also is beneficial for those Instruction Set Architectures (ISAs) that do not support greater than two operands.

In a further embodiment, this instruction may be used to convert Boolean flags into values in integer registers. It may be the same instruction or one similar referred to as Set Boolean. This provides an efficient, less complex and less expensive, in terms of instructions and/or registers, technique for obtaining a Boolean value for a particular condition, including simple conditions (such as, e.g., less than, greater than or equal), composite conditions (such as, e.g., less than or equal, or greater than or equal) or other types of conditions, such as unordered conditions.

Although an example of the instruction is provided for the Power Architecture, one or more aspects are equally applicable to other architectures, including but not limited to, the z/Architecture and the Intel architecture. However, in other architectures, the selected field may be designated in other ways. For instance, in the z/Architecture, the PSW specifies the selected field, and in the Intel architecture, a flags field may be used. Since there is only one condition code or selected field, there is no BFA field. Other variations are also possible.

In one embodiment, the machine instruction to perform the set operation is a single machine instruction having an architected opcode and implemented with combinatorial logic (e.g., a network of logic gates, including one or more of AND, OR, NOT, NAND, XOR etc.), such that only a single pass through the processor pipeline is used. In one aspect, execution of the instruction, including, e.g., checking contents of a selected field; determining, based on the checking, whether the contents of the selected field indicate a first condition, a second condition or a third condition represented in one data type; and setting the result location to a value based on the determining, wherein the value, based on the setting, is of a data type different from the one data type and represents a result of a previously executed instruction, the result of the previously executed instruction being one of the first condition, the second condition or the third condition, does not require micro-operations or multiple passes through the processor pipeline. The combinatorial logic, in one aspect, performs the checking, determining and setting.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 6:
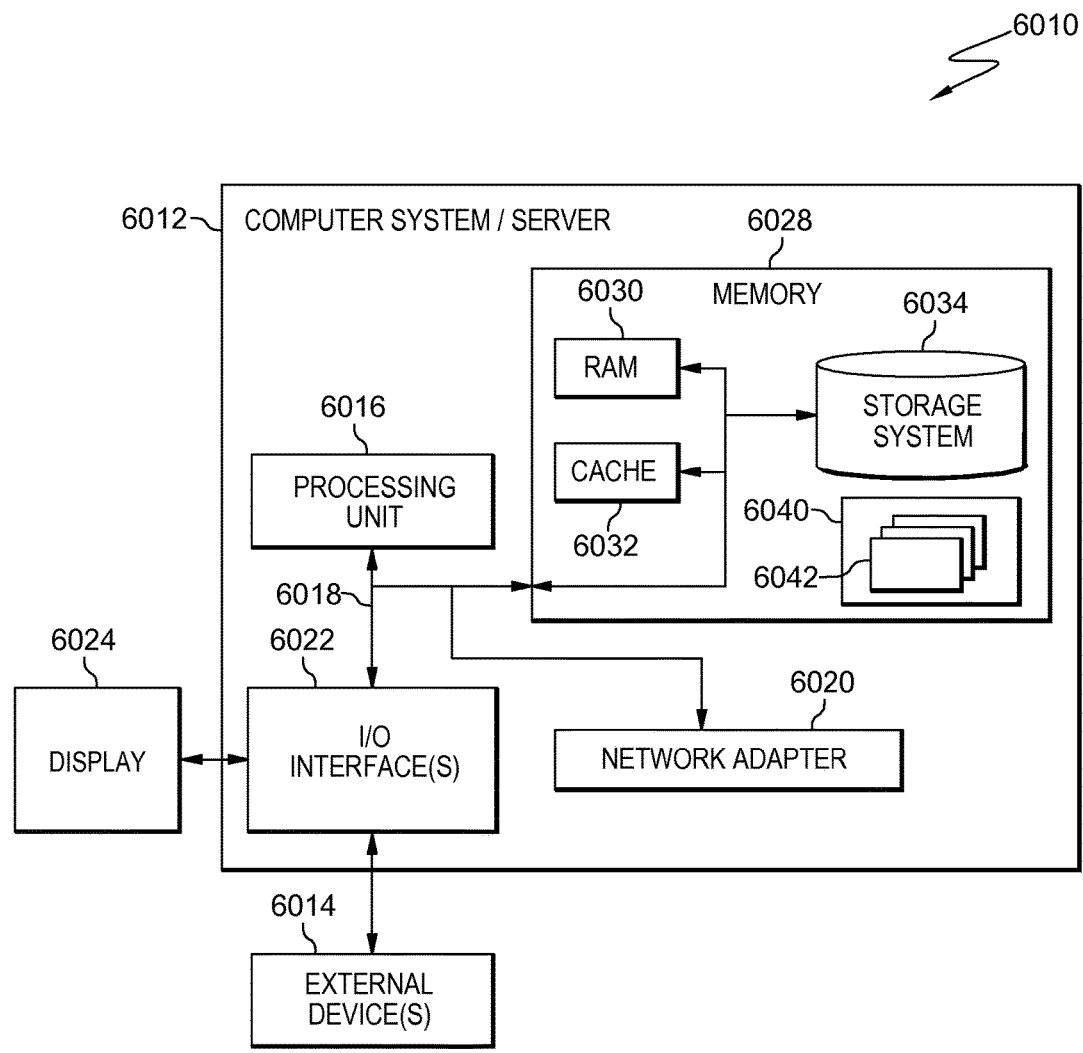
FIG. 6 depicts one example of a cloud computing node, in accordance with one or more aspects.

Referring now to FIG. 6, a schematic of an example of a cloud computing node is shown. Cloud computing node 6010 is only one example of a suitable cloud computing node and is not intended to suggest any limitation as to the scope of use or functionality of embodiments of the invention described herein. Regardless, cloud computing node 6010 is capable of being implemented and/or performing any of the functionality set forth hereinabove.

In cloud computing node 6010 there is a computer system/server 6012, which is operational with numerous other general purpose or special purpose computing system environments or configurations. Examples of well-known computing systems, environments, and/or configurations that may be suitable for use with computer system/server 6012 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 6012 may be described in the general context of computer system executable instructions, such as program modules, being executed by a computer system. Generally, program modules may include routines, programs, objects, components, logic, data structures, and so on that perform particular tasks or implement particular abstract data types. Computer system/server 6012 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 6012 in cloud computing node 6010 is shown in the form of a general-purpose computing device. The components of computer system/server 6012 may include, but are not limited to, one or more processors or processing units 6016, a system memory 6028, and a bus 6018 that couples various system components including system memory 6028 to processor 6016.

Bus 6018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 6012 typically includes a variety of computer system readable media. Such media may be any available media that is accessible by computer system/server 6012, and it includes both volatile and non-volatile media, removable and non-removable media.

System memory 6028 can include computer system readable media in the form of volatile memory, such as random access memory (RAM) 6030 and/or cache memory 6032. Computer system/server 6012 may further include other removable/non-removable, volatile/non-volatile computer system storage media. By way of example only, storage system 6034 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 6018 by one or more data media interfaces. As will be further depicted and described below, memory 6028 may include at least one program product having a set (e.g., at least one) of program modules that are configured to carry out the functions of embodiments of the invention.

Program/utility 6040, having a set (at least one) of program modules 6042, may be stored in memory 6028 by way of example, and not limitation, as well as an operating system, one or more application programs, other program modules, and program data. Each of the operating system, one or more application programs, other program modules, and program data or some combination thereof, may include an implementation of a networking environment. Program modules 6042 generally carry out the functions and/or methodologies of embodiments of the invention as described herein.

Computer system/server 6012 may also communicate with one or more external devices 6014 such as a keyboard, a pointing device, a display 6024, etc.; one or more devices that enable a user to interact with computer system/server 6012; and/or any devices (e.g., network card, modem, etc.) that enable computer system/server 6012 to communicate with one or more other computing devices. Such communication can occur via Input/Output (I/O) interfaces 6022. Still yet, computer system/server 6012 can communicate with one or more networks such as a local area network (LAN), a general wide area network (WAN), and/or a public network (e.g., the Internet) via network adapter 6020. As depicted, network adapter 6020 communicates with the other components of computer system/server 6012 via bus 6018. It should be understood that although not shown, other hardware and/or software components could be used in conjunction with computer system/server 6012. Examples, include, but are not limited to: microcode, device drivers, redundant processing units, external disk drive arrays, RAID systems, tape drives, and data archival storage systems, etc.

Figure 7:
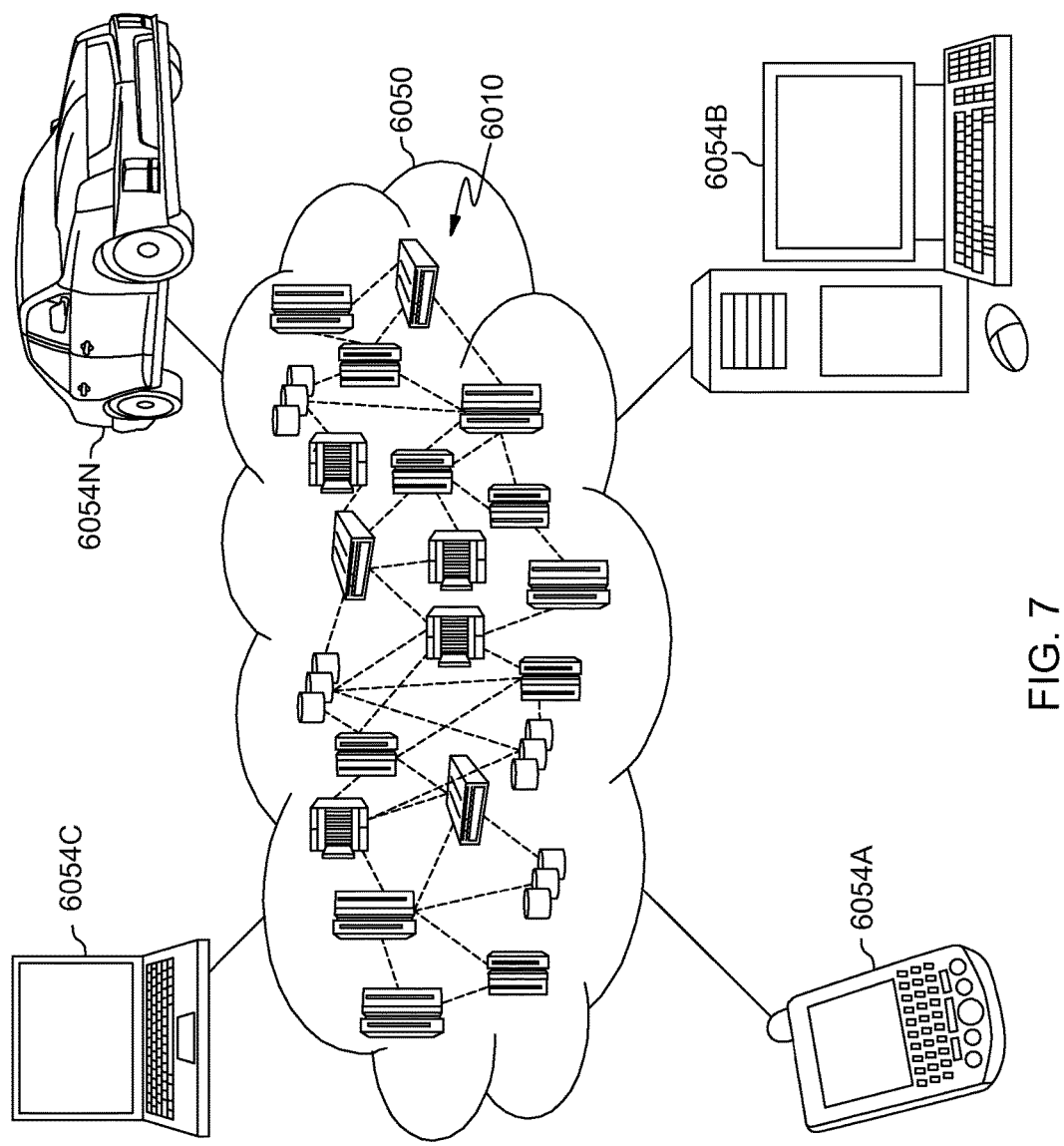
FIG. 7 depicts one embodiment of a cloud computing environment, in accordance with one or more aspects.

Referring now to FIG. 7, illustrative cloud computing environment 6050 is depicted. As shown, cloud computing environment 6050 comprises one or more cloud computing nodes 6010 with which local computing devices used by cloud consumers, such as, for example, personal digital assistant (PDA) or cellular telephone 6054A, desktop computer 6054B, laptop computer 6054C, and/or automobile computer system 6054N may communicate. Nodes 6010 may communicate with one another. They may be grouped (not shown) physically or virtually, in one or more networks, such as Private, Community, Public, or Hybrid clouds as described hereinabove, or a combination thereof. This allows cloud computing environment 6050 to offer infrastructure, platforms and/or software as services for which a cloud consumer does not need to maintain resources on a local computing device. It is understood that the types of computing devices 6054A-N shown in FIG. 7 are intended to be illustrative only and that computing nodes 6010 and cloud computing environment 6050 can communicate with any type of computerized device over any type of network and/or network addressable connection (e.g., using a web browser).

Figure 8:
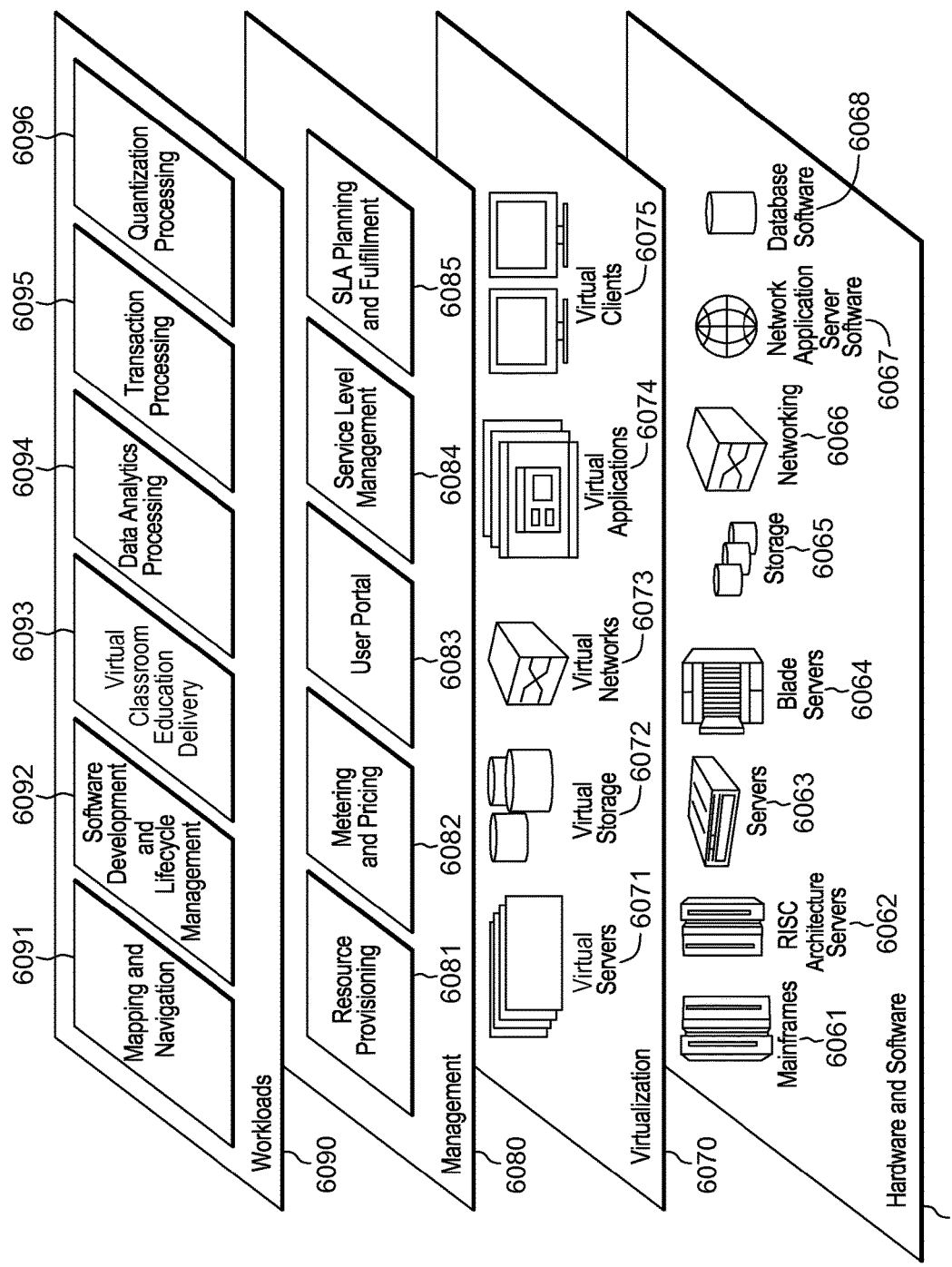
FIG. 8 depicts one example of abstraction model layers, in accordance with one or more aspects.

Referring now to FIG. 8, a set of functional abstraction layers provided by cloud computing environment 6050 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 6060 includes hardware and software components. Examples of hardware components include mainframes 6061; RISC (Reduced Instruction Set Computer) architecture based servers 6062; servers 6063; blade servers 6064; storage devices 6065; networks and networking components 6066. In some embodiments, software components include network application server software 6067 and database software 6068.

Virtualization layer 6070 provides an abstraction layer from which the following examples of virtual entities may be provided: virtual servers 6071; virtual storage 6072; virtual networks 6073, including virtual private networks; virtual applications and operating systems 6074; and virtual clients 6075.

In one example, management layer 6080 may provide the functions described below. Resource provisioning 6081 provides dynamic procurement of computing resources and other resources that are utilized to perform tasks within the cloud computing environment. Metering and Pricing 6082 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 6083 provides access to the cloud computing environment for consumers and system administrators. Service level management 6084 provides cloud computing resource allocation and management such that required service levels are met. Service Level Agreement (SLA) planning and fulfillment 6085 provide pre-arrangement for, and procurement of, cloud computing resources for which a future requirement is anticipated in accordance with an SLA.

Workloads layer 6090 provides examples of functionality for which the cloud computing environment may be utilized. Examples of workloads and functions which may be provided from this layer include: mapping and navigation 6091; software development and lifecycle management 6092; virtual classroom education delivery 6093; data analytics processing 6094; transaction processing 6095; and quantization processing of one or more aspects of the present invention 6096.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for executing a machine instruction in a computing environment, the computer program product including a non-transitory storage medium readable by a processing circuit and storing instructions for execution by the processing circuit for performing a method, the method comprising: obtaining, by a processor, the machine instruction to perform a set operation, the machine instruction having associated therewith a result location to be used for the set operation, the machine instruction being a single architected instruction implemented with combinatorial logic; and executing, by the processor, the machine instruction, the executing comprising: checking contents of a selected field within a condition register, the selected field having a plurality of bits with values indicative of a particular condition of multiple conditions; determining, based on the checking, which condition of the multiple conditions the contents of the selected field indicate, the multiple conditions being in one data representation type used in computing, and including a first condition, a second condition, and a third condition; and setting the result location to a value based on the determining, wherein the value, based on the setting, is of another data representation type used in computing different in computing data representation type from the one data representation type, and represents in the other data representation type used in computing a result of a previously executed instruction, the result of the previously executed instruction being one of the first condition, the second condition or the third condition in the one data representation type used in computing, wherein the determining and the setting comprise: checking whether a first selected bit of the contents is equal to one value, and based only on the first selected bit equaling the one value, setting the value equal to a first value; based on the first selected bit equaling another value, determining whether a second selected bit of the contents is equal to the one value, and based on the first selected bit equaling the other value and only on the second selected bit equaling the one value, setting the value equal to a second value; and based on the first selected bit and the second selected bit equaling the other value, setting the value equal to a third value; and wherein the first value, the second value and the third value comprise different values.

2. The computer program product of claim 1, wherein the value is equal to a first value based on the determining indicating the first condition, equal to a second value based on the determining indicating the second condition, and equal to a third value based on the determining indicating the third condition.

3. The computer program product of claim 1, wherein the first value comprises −1, the second value comprises 1, and the third value comprises 0.

4. The computer program product of claim 1, wherein the setting the result location comprises placing the value in a register designated by a result field of the machine instruction.

5. The computer program product of claim 1, wherein the first condition comprises a less than condition, the second condition comprises a greater than condition, and the third condition comprises an equal condition.

6. The computer program product of claim 1, wherein the selected field is a field within a condition register, the condition register comprising a plurality of fields to include a plurality of condition codes, the selected field including a condition code of the plurality of condition codes, and wherein the machine instruction comprises a selection field to include a selection indicator, the selection indicator to select the selected field.

7. The computer program product of claim 1, wherein the selected field is a field of one of a program status word, a condition register or a flags field.

8. The computer program product of claim 1, wherein the previously executed instruction comprises a compare instruction, wherein based on execution of the compare instruction, a condition code is placed in the selected field.

9. A computer system for executing a machine instruction in a computing environment, the computer system comprising: a memory; and a processor in communications with the memory, wherein the computer system is configured to perform a method, said method comprising: obtaining, by a processor, the machine instruction to perform a set operation, the machine instruction having associated therewith a result location to be used for the set operation, the machine instruction being a single architected instruction implemented with combinatorial logic; and executing, by the processor, the machine instruction, the executing comprising: checking contents of a selected field within a condition register, the selected field having a plurality of bits with values indicative of a particular condition of multiple conditions; determining, based on the checking, which condition of the multiple conditions the contents of the selected field indicate, the multiple conditions being in one data representation type used in computing, and including a first condition, a second condition, and a third condition; and setting the result location to a value based on the determining, wherein the value, based on the setting, is of another data representation type used in computing different in computing data representation type from the one data representation type, and represents in the other data representation type used in computing a result of a previously executed instruction, the result of the previously executed instruction being one of the first condition, the second condition or the third condition in the one data representation type used in computing, wherein the determining and the setting comprise: checking whether a first selected bit of the contents is equal to one value, and based only on the first selected bit equaling the one value, setting the value equal to a first value; based on the first selected bit equaling another value, determining whether a second selected bit of the contents is equal to the one value, and based on the first selected bit equaling the other value and only on the second selected bit equaling the one value, setting the value equal to a second value; and based on the first selected bit and the second selected bit equaling the other value, setting the value equal to a third value; wherein the first value, the second value, and the third value comprise different values.

10. The computer system of claim 9, wherein the value is equal to a first value based on the determining indicating the first condition, equal to a second value based on the determining indicating the second condition, and equal to a third value based on the determining indicating the third condition.

11. The computer system of claim 9, wherein the selected field is a field within a condition register, the condition register comprising a plurality of fields to include a plurality of condition codes, the selected field including a condition code of the plurality of condition codes, and wherein the machine instruction comprises a selection field to include a selection indicator, the selection indicator to select the selected field.

12. The computer system of claim 9, wherein the previously executed instruction comprises a compare instruction, wherein based on execution of the compare instruction, a condition code is placed in the selected field.

* * * * *